(12) United States Patent
Narita

(10) Patent No.: US 9,568,991 B2
(45) Date of Patent: Feb. 14, 2017

(54) AUDIO DATA PROCESSING DEVICE

(71) Applicant: TEAC Corporation, Tokyo (JP)

(72) Inventor: Hironobu Narita, Tokyo (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 15/052,731

(22) Filed: Feb. 24, 2016

(65) Prior Publication Data

US 2016/0246361 A1    Aug. 25, 2016

(30) Foreign Application Priority Data

Feb. 25, 2015   (JP) ................................ 2015-035504

(51) Int. Cl.
*G06F 1/32* (2006.01)
*G06F 3/16* (2006.01)
*G10H 1/00* (2006.01)

(52) U.S. Cl.
CPC .......... *G06F 1/3296* (2013.01); *G06F 1/3228* (2013.01); *G10H 1/00* (2013.01)

(58) Field of Classification Search
None
See application file for complete search history.

(56) References Cited

FOREIGN PATENT DOCUMENTS

| JP | 6-266353 A | 9/1994 |
|---|---|---|
| JP | 2650481 B2 | 9/1997 |
| JP | 2000-172257 A | 6/2000 |

*Primary Examiner* — Ernest Unelus
*Assistant Examiner* — Dayton Lewis-Taylor
(74) *Attorney, Agent, or Firm* — Seed IP Law Group LLP

(57) ABSTRACT

There is provided an audio data processing device. The device includes an IN terminal to which first audio data from outside are input, a THRU terminal from which the first audio data are output to the outside, an FPGA which signal-processes the first audio data from the IN terminal, an OUT terminal from which second audio data which are signal-processed are output to the outside, and a power supply switch. The FPGA outputs the first audio data from the IN terminal to the THRU terminal without any processing when the power supply switch is in an ON state and is also supplied with operational power and outputs the first audio data from the IN terminal to the THRU terminal without any processing when the power supply switch is in an OFF state.

7 Claims, 4 Drawing Sheets

AUDIO DATA PROCESSING DEVICE

PRIORITY INFORMATION

This application claims priority to Japanese Patent Application No. 2015-035504 filed on Feb. 25, 2015, which is incorporated herein by reference in its entirety.

BACKGROUND

Technical Field

The present invention relates to an audio data processing device, and in particular, to a processing of a through output in a device having an input terminal, a through terminal, and an output terminal.

Related Art

Sound recording devices, electronic musical instruments, or the like having an input terminal, a through terminal, and an output terminal are known.

JP 2650481 B discloses an electronic musical instrument in which the output terminal and a through terminal are shared as a common terminal, in order to effectively construct a network between electronic devices, in consideration of a problem that noise or the like tends to easily appear on a MIDI cable.

JP H6-266353 A discloses a technique, in an electronic musical instrument having a function to output music performance data, in which an output terminal and a through terminal are shared as a common terminal, and an internal output and a through output are automatically switched according to an output state of input data and internal data, in order to simplify an operation for switching soft-through.

In a sound recording device and a data recording device such as an electronic musical instrument having an input terminal, a through terminal, and an output terminal, in order to through-output an input signal from the through terminal even when the power supply of the device is switched OFF, the input terminal and the through terminal must be connected to each other. However, with the connection switching of the input terminal and the through terminal when the power supply is switched OFF, a switching noise would appear in the through output, thereby degrading quality of the signal which is through-output to an external device.

An advantage of the present invention lies in the provision of an audio data processing device in which the switching noise does not appear in the through output even when the power supply of the device is switched from the ON state to the OFF state.

SUMMARY

According to one aspect of the present invention, there is provided an audio data processing device comprising: an input terminal to which first audio data from outside is input; a through terminal from which the first audio data is output to the outside; a signal processor that signal-processes the first audio data from the input terminal; an output terminal from which second audio data which is signal-processed by the signal processor is output to the outside; and a power supply switch, wherein the signal processor outputs the first audio data from the input terminal to the through terminal without any processing when the power supply switch is in an ON state, and outputs the first audio data from the input terminal to the through terminal without any processing also when the power supply switch is in an OFF state.

According to this aspect of the present invention, even when the power switch is in the OFF state, the signal processor outputs the first audio data from the input terminal to the through terminal without any processing, similar to the case where the power supply switch is in the ON state. Therefore, the path for the through output is not switched between the ON state of the power supply and the OFF state of the power supply, and the data is output through the same signal path, and, consequently, the noise due to the switching does not appear in the through output. Normally, in the OFF state of the power supply, the operation of the signal processor is stopped, but according to this aspect of the present invention, some functions of the signal processor, including at least the through function, continue to operate even during the OFF state of the power supply.

According to another aspect of the present invention, preferably, in the audio data processing device, the signal processor comprises: a first signal processing unit that outputs the first audio data from the input terminal to the through terminal without any processing when the power supply switch is in the ON state and outputs the first audio data from the input terminal to the through terminal without any processing also when the power supply switch is in the OFF state; and a second signal processing unit that signal-processes the first audio data from the input terminal and records the signal-processed data in a recording medium when the power supply switch is in the ON state, and stops operation when the power supply switch is in the OFF state.

According to another aspect of the present invention, preferably, the audio data processing device further comprises a power supplying unit that supplies an operational power to the signal processor, wherein the power supplying unit supplies the operational power to the first signal processing unit and the second signal processing unit when the power supply switch is in the ON state, and continues to supply the operational power to the first signal processing unit and does not supply the operational power to the second signal processing unit when the power supply switch is in the OFF state. According to another aspect of the present invention, preferably, the audio data processing device further comprises a relay circuit that switches between connection and disconnection of the input terminal and the through terminal and between connection and disconnection of the through terminal and the signal processor, wherein the relay circuit disconnects the input terminal and the through terminal and connects the through terminal and the signal processor both when the power supply switch is in the ON state and when the power supply switch is in the OFF state, and connects the input terminal and the through terminal and disconnects the through terminal and the signal processor when an external power supply is lost.

According to another aspect of the present invention, preferably, in the audio data processing device, the input terminal, the output terminal, and the through terminal are equipped as a MADI interface card, and the power supplying unit does not supply the operational power to the first signal processing unit when it is detected that the through terminal does not exist in an equipped MADI interface card and when the power supply switch is in the OFF state.

According to various aspects of the present invention, no switching noise appears in the through output even when the power supply of the device is switched from the ON state to the OFF state, and high-quality output can be maintained.

BRIEF DESCRIPTION OF THE DRAWINGS

A preferred embodiment of the present invention will be described in detail by reference to the following drawings, wherein.

DESCRIPTION OF EXEMPLARY EMBODIMENTS

A preferred embodiment of the present invention will now be described with reference to the drawings, exemplifying a multi-track recorder (MTR) which processes an audio signal and records in a plurality of tracks as an audio data processing device.

Figure 1:
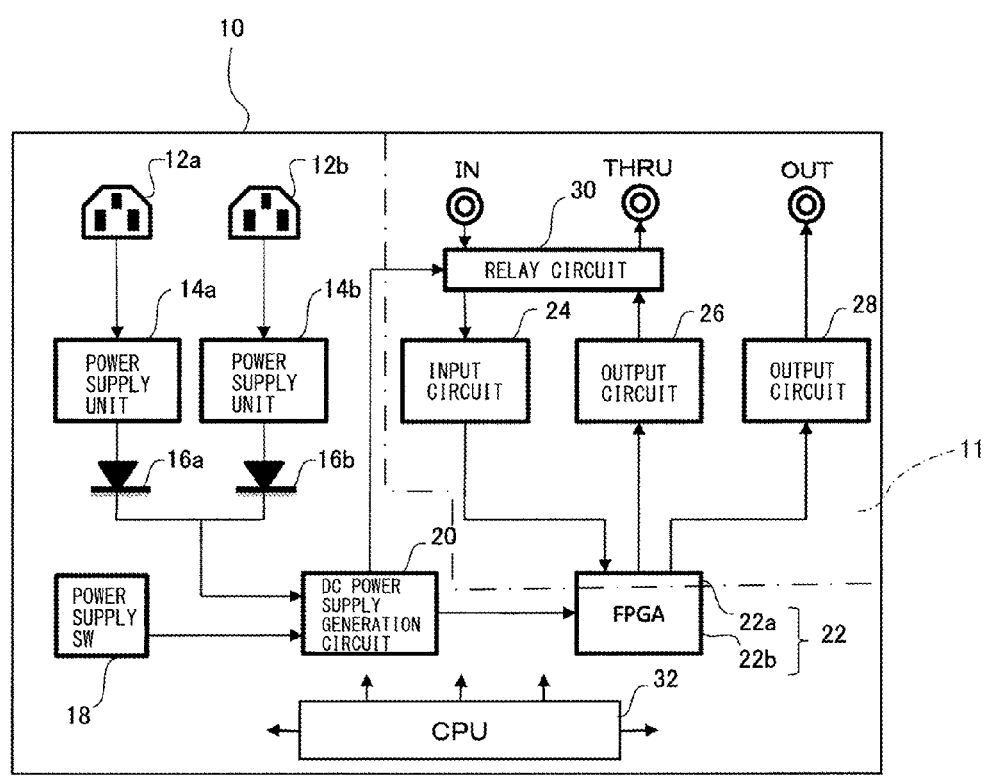
FIG. 1 is a block diagram of a structure of a preferred embodiment of the present invention.

FIG. 1 is a structural block diagram of an MTR 10. The MTR 10 comprises AC power supplies 12a and 12b, power supply units 14a and 14b, a power supply switch (SW) 18, a DC power supply generation circuit 20, an FPGA (Field Programmable Gate Array) 22, an input circuit 24, output circuits 26 and 28, and a CPU 32, and further comprises an input terminal (IN terminal), a through terminal (THRU terminal), and an output terminal (OUT terminal).

The MTR 10 further comprises a flash ROM for storing a control program, a recording medium for recording signal-processed audio data, a display such as a TFT display, a USB connector, an analog sound output terminal, a DAC (Digital-to-Analog Converter), or the like. As these elements are known for a multi-track recorder, these elements will not be described.

The IN terminal, the THRU terminal, the OUT terminal, the input circuit 24, the output circuits 24 and 26, and the FGPA 22 are provided, for example, on a MADI (Multi-channel Audio Digital Interface) interface card 11, which is equipped in a predetermined slot of a body of the MTR 10 to be equipped in the MTR 10. More specifically, the FPGA 22 comprises an FPGA 22a on the interface card side and an FPGA 22b on the MTR 10 body side, and, with the interface card 11 being equipped in the slot, the FPGA 22a and the FPGA 22b are connected through connectors.

The AC power supplies 12a and 12b are connected to external AC power supplies through power supply cords. The AC power supplies 12a and 12b are connected to the AC/DC power supply units 14a and 14b and diodes 16a and 16b, respectively.

The AC power supply 12a, the AC/DC power supply unit 14a and the diode 16a, and the AC power supply 12b, the AC/DC power supply unit 14b, and the diode 16b form a double system or a redundant system, and the DC power from the diodes 16a and 16b is supplied to the DC power supply generation circuit 20. Even when there is an abnormality in one of the external AC power supplies or the power supply systems, the device can be continued to be driven by the power from one of the power supply systems.

The power supply switch (SW) 18 is provided on a front panel or the like of the device, and switches between ON and OFF states of the power supply of the device. A manipulation signal of the power supply switch 18 is supplied to the DC power supply generation circuit 20.

The DC power supply generation circuit 20 receives DC power from the power supply circuit of the redundant system, and supplies operational power to each unit of the device.

The FPGA (Field Programmable Gate Array) 22 comprises the FPGA 22a on the interface card side and the FPGA 22b on the body side. The FPGA 22 functions as a signal processor. The FPGA 22 receives supply of the operational power from the DC power supply generation circuit 20 and operates, and applies various effect processes, an equalizing process, a mixing process, or the like on the input signal and records the processed signal in a recording medium. More specifically, the FPGA 22b on the body side applies various effect processes, the equalizing process, the mixing process, or the like on the input signal, and records the processed signal in the recording medium. In the present embodiment, the input signal is processed and audio data is recorded in 64 tracks. All of the 64 tracks may be stereo tracks, or a part of the tracks may be monaural tracks. Alternatively, the stereo and monaural may be suitably switched. The recording medium is, for example, a semiconductor memory such as an SD card, but is not limited thereto. The FPGA 22 also reads the audio data recorded in the recording medium, and outputs from the output terminal (OUT terminal) to the external device. Further, the FPGA 22 has a through function to through-output the input signal to the outside without any processing. More specifically, the FPGA 22a on the interface card 11 side through-outputs the input signal to the outside without any processing. That is:

FPGA 22=FPGA 22a+FPGA 22b

FPGA 22a: Through-outputs the input signal to the outside without any processing FPGA 22b: Applies various processes on the input signal and records in the recording medium.

The IN terminal which is the input terminal receives input of an audio signal from the outside, and supplies the input signal to the input circuit 24 through a relay circuit 30. The input circuit 24 supplies the input signal to the FPGA 22.

The THRU terminal which is the through terminal is connected to the output circuit 26 through the relay circuit 30. When the FPGA 22 executes the through function, the FPGA 22 outputs the input signal from the through terminal (THRU terminal) without any processing, through the output circuit 26 and the relay circuit 30.

The OUT terminal which is the output terminal is connected to the output circuit 28. The FPGA 22 outputs audio data to which various processes have been applied, from the output terminal (OUT terminal) through the output circuit 28.

The CPU 32 controls operations of various units of the MTR 10 according to the control program stored in the flash ROM. The CPU 32 controls operations of various units; in particular, the operation of the FPGA 22, according to the manipulation signals of various manipulation buttons provided on the front panel. In addition, the CPU 32 controls the operation of the DC power supply generation circuit 20 according to a manipulation signal of the power supply switch (SW) 18.

Specifically, when the power supply switch (SW) 18 is switched ON, the CPU 32 controls the DC power supply generation circuit 20 according to the ON signal, and supplies the operational power to various elements of the MTR 10; more specifically, to the FPGA 22, the input circuit 24, the output circuits 26 and 28, and the relay circuit 30. In this process, the relay circuit disconnects the connection between the IN terminal and the THRU terminal and connects the output circuit 26 and the THRU terminal according to a command from the CPU 32. Thus, the input signal from the IN terminal is output from the THRU terminal only through the FPGA 22; more specifically, the FPGA 22a.

When the power supply switch (SW) is switched OFF, the CPU 32 controls the DC power supply generation circuit 20 according to the OFF signal, maintains the supply of power to the FPGA 22, the input circuit 24, the output circuit 26, and the relay circuit 30, and maintains these elements in the operation state. Specifically, the supply of power to the FPGA 22a is maintained and the supply of power to the FPGA 22b is stopped. Thus, even in the OFF state of the power supply, the input signal from the IN terminal is output from the THRU terminal through the FPGA 22a. It should be noted that the path of the through output is the same between the time when the power supply is in the ON state and the power supply is in the OFF state. In other words, in the present embodiment, the through output is not switched corresponding to the switching of the power supply between ON and OFF, and no switching noise appears in the through output. In addition, because the input signal from the IN terminal is biased by passing through the input circuit 24 and the output circuit 26, loss of the signal level produced in the transmission cable is compensated for.

During the OFF state of the power supply also, the operational power is supplied to the FPGA 22a, but this is for outputting the input signal from the IN terminal to the THRU terminal through the output circuit 26 without any processing, and no operational power is supplied to the FPGA 22b. Thus, various effect processes, the equalizing process, the writing process to the SD card, or the like which are executed on the input signal during the ON state of the power supply are not executed. Therefore, the power consumption during the OFF state of the power supply is also minimized.

In addition, in the present embodiment, as described above, the power supply system is a double system or a redundant system. Because of this, even when there is an abnormality in the external power supply, the MTR 10 can continue to operate. However, when abnormalities occur in both systems of the double system and the external power is disconnected, the CPU 32 detects the disconnection, and commands the relay circuit 30 to connect the IN terminal and the THRU terminal and disconnect the THRU terminal and the output circuit 26. With this process, it becomes possible to output the input signal from the IN terminal to the THRU terminal without any processing.

Next, an operation in the present embodiment will be described in detail separately for the time during the ON state of the power supply, the time during the OFF state of the power supply, and the time when the external power supply is lost.

<ON State of Power Supply>

Figure 2:
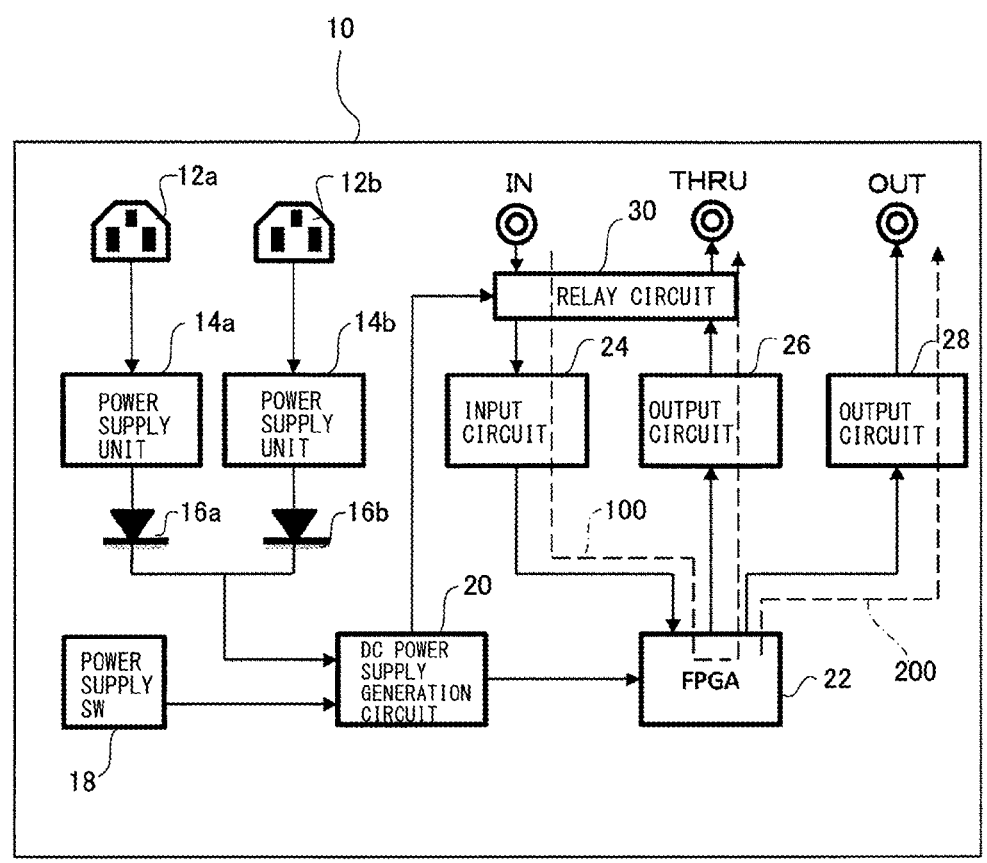
FIG. 2 is an operation explanation diagram when a power supply is ON in the preferred embodiment of the present invention.

FIG. 2 shows an operation state when the power supply is in the ON state. The relay circuit 30 disconnects the IN terminal and the THRU terminal and connects the THRU terminal and the output circuit 26.

The input signal from the in terminal is supplied in the order of:

IN terminal→relay circuit 30→input circuit 24→FPGA 22a→FPGA 22b.

The FPGA 22b processes the input signal and records in the recording medium. The FPGA 22a outputs the input signal to the output circuit 26 without any processing. Further, the FPGAs 22a and 22b output processed audio data to the output circuit 28 following a command of the CPU 32, and according to a manipulation signal from the manipulation button.

Thus, with regard to the through output, the signal is supplied in the order of:

IN terminal→relay circuit 30→input circuit 24→FPGA 22a→output circuit 26→relay circuit 30→THRU terminal.

In the drawing, the path of the through output is shown with a broken line 100. The processed audio data are supplied in the order of:

FPGA 22b→FPGA 22a→output circuit 28→OUT terminal.

In the drawing, the path of this output signal is shown with another broken line 200.

<OFF State of Power Supply>

Figure 3:
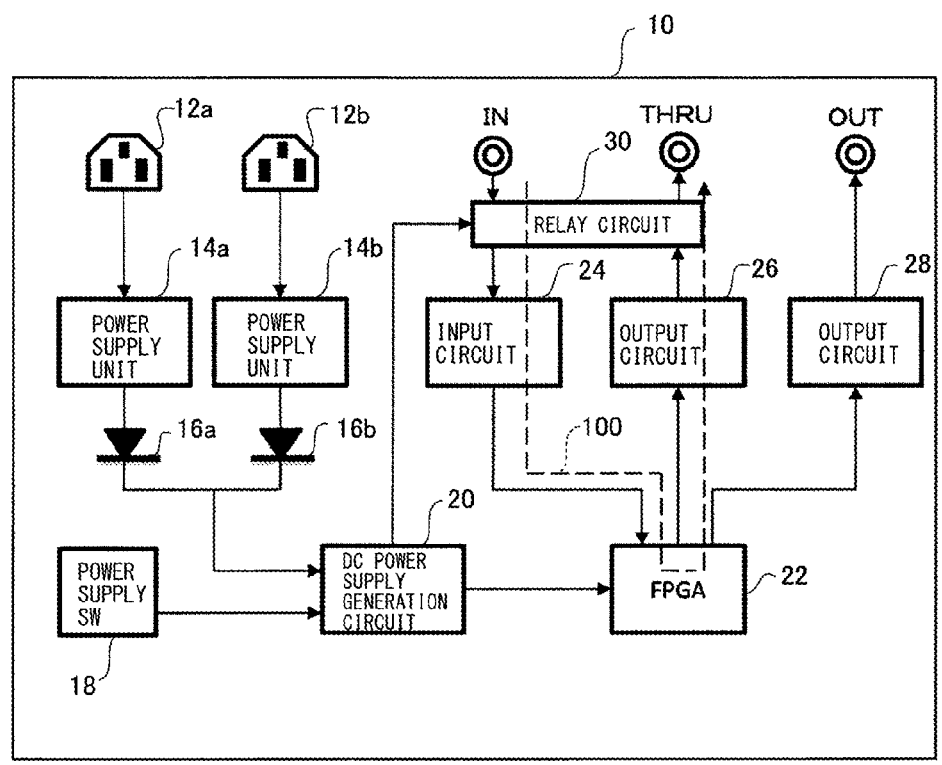
FIG. 3 is an operation explanation diagram when a power supply is OFF in the preferred embodiment of the present invention.

FIG. 3 shows an operation state when the power supply is in the OFF state. The relay circuit 30 is in the same state as the ON state of the power supply. In other words, the relay circuit 30 disconnects the IN terminal and the THRU terminal and connects the THRU terminal and the output circuit 26.

An input signal from the IN terminal is supplied in the order of:

IN terminal→relay circuit 30→input circuit 24→FPGA 22a.

The FPGA 22a is supplied with the operational power from the DC power supply generation circuit 20 also during the OFF state of the power supply such that the operation state thereof is maintained, and outputs the input signal to the output circuit 26 without any processing.

Thus, with regard to the through output, the signal is supplied in the order of:

IN terminal→relay circuit 30→input circuit 24→FPGA 22a→output circuit 26→relay circuit 30→THRU terminal.

The through output paths for the ON state of the power supply and the OFF state of the power supply are the same.

The state of the power supply switch (SW) 18 is normally displayed by lighted/non-lighted states of an LED provided near the switch. When the power supply switch (SW) 18 is switched OFF, the operational power is continued to be supplied to the FPGA 22a. However, as the MTR 10 as a whole stops the operation, the LED is set in the non-lighted state. Therefore, the user would not recognize that the power continues to be supplied to the FPGA 22a and the FPGA 22a continues to be in the operation state even during the OFF state of the power supply. The FPGA 22a may be said to maintain the through process at the background even after the power supply is switched OFF.

<During Loss of External Power Supply>

Even when an abnormality occurs in one of the AC power supplies 12a and 12b, power can be supplied from the other which is normal, and the operations of the ON state of the power supply and the OFF state of the power supply as described above can be maintained.

Figure 4:
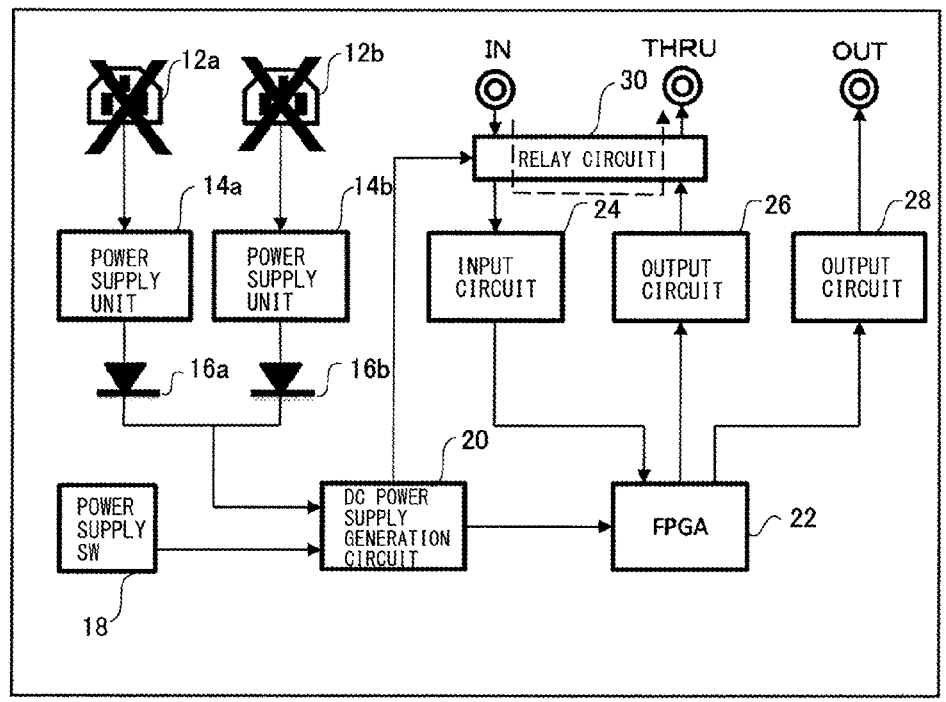
FIG. 4 is an operation explanation diagram when an external power supply is lost in the preferred embodiment of the present invention.

FIG. 4 shows an operation state when abnormalities occur in both of the AC power supplies 12a and 12b. The relay circuit 30 connects the IN terminal and the THRU terminal and disconnects the THRU terminal and the output circuit 26 by a command from the CPU 32.

The input signal from the IN terminal is supplied in the order of:

IN terminal→relay circuit 30→THRU terminal.

Because there is no supply of power from the AC power supplies 12a and 12b, the FPGA 22 also stops operating, and the FPGA 22 cannot execute the through function. However, because the IN terminal and the THRU terminal are connected to each other by the relay circuit 30, the through function itself is maintained.

Figure 5:
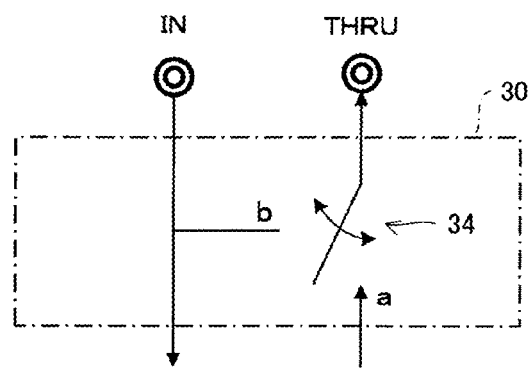
FIG. 5 is a structural diagram of a relay circuit in the preferred embodiment of the present invention.

FIG. 5 shows an example structure of the relay circuit 30.

The relay circuit 30 is formed from a switching switch 34. The switching switch 34 is selectively switched between a connection point a and a connection point b by a command from the CPU 32. The connection point a is connected to the output circuit 26 and the connection point b is connected to the IN terminal.

The switching switch 34 is switched to the connection point a both during the ON state of the power supply and the OFF state of the power supply. With such a configuration, the IN terminal and the THRU terminal are disconnected, and the THRU terminal and the output circuit 26 are connected. During the loss of the AC power supply, the switching switch 34 is switched to the connection point b. With such a configuration, the IN terminal and the THRU terminal are connected, and the THRU terminal and the output circuit 26 are disconnected.

As described, in the present embodiment, the path for the through output is maintained even when the power supply is switched from the ON state to the OFF state. Because of this, no switching noise occurs in the through output, and the signal quality of the through output can be maintained. In addition, because the loss of the input signal level is compensated for by the input circuit 24 and the output circuit 26, the signal quality of the through output can be maintained at a high level. In addition, even when an abnormality occurs in the external power supply, the through function can be maintained, and the signal can be through-output to the external device.

In the present embodiment, an MTR 10 having the IN terminal, the THRU terminal, and the OUT terminal has been described. However, depending on the interface card equipped on the slot of the MTR 10, there may be cases in which only the IN terminal and the OUT terminal are provided, and there is no THRU terminal. In this case, the CPU 32 preferably detects that the THRU terminal does not exist based on an ID of the equipped interface card, and stops the operation of the FPGA 22a or the like by not supplying the operational power during the OFF state of the power supply. In other words, it is desirable that the CPU 32 determines whether or not there is a THRU terminal in the MTR 10, and applies a control to continue supplying the power to the FPGA 22a even during the OFF state of the power supply only when the THRU terminal exists.

In addition, in the present embodiment, a configuration is described in which the IN terminal, the THRU terminal, the OUT terminal, the input circuit 24, the output circuits 26 and 28, and the FPGA 22a are equipped on the MADI interface card, and the interface card is equipped on the body slot of the MTR 10. Alternatively, these members may be directly incorporated in the body of the MTR 10.

Moreover, in the present embodiment, a configuration is described in which the FPGA 22 comprises the FPGA 22a and the FPGA 22b, but alternatively, the FPGA may be a single FPGA 22. In this case, the single FPGA 22 applies a predetermined signal process on the input signal from the IN terminal and records the processed signal in the recording medium, and outputs the input signal to the THRU terminal without any processing when the power supply switch (SW) 18 is in the ON state, and outputs the input signal from the IN terminal to the THRU terminal without any processing in the OFF state of the power supply switch (SW) 18. The DC power supply generation circuit 20 continues to supply the operational power to the single FPGA 22 even in the OFF state of the power supply. The FPGA is a type of a PLD (Programmable Logic Device), and has a logic block as a programmable logic component. The FPGA of the present embodiment is only an example of an integrated circuit having a logic block, and a person with ordinary skill in the art would be able to use any arbitrary PLD as the signal processor.

Further, in the present embodiment, the input signal is input through the input circuit 24 and is through-output through the output circuit 26. However, if it is only desired to prevent production of the switching noise in the through output, the present embodiment can be applied to a signal path which does not have one or both of the input circuit 24 and the output circuit 26 between the relay circuit 30 and the FPGA 22.

What is claimed is:

1. An audio data processing device comprising:
    an input terminal to which first audio data from outside are input;
    a through terminal from which the first audio data are output to the outside;
    a signal processor that signal-processes the first audio data from the input terminal;
    an output terminal from which second audio data which are signal-processed by the signal processor are output to the outside; and
    a power supply switch, wherein
    the signal processor outputs the first audio data from the input terminal to the through terminal without any processing when the power supply switch is in an ON state, and outputs the first audio data from the input terminal to the through terminal without any processing also when the power supply switch is in an OFF state.

2. The audio data processing device according to claim 1, wherein
    the signal processor comprises:
    a first signal processing unit that outputs the first audio data from the input terminal to the through terminal without any processing when the power supply switch is in the ON state and outputs the first audio data from the input terminal to the through terminal without any processing also when the power supply switch is in the OFF state; and
    a second signal processing unit that signal-processes the first audio data from the input terminal and records the signal-processed data in a recording medium when the power supply switch is in the ON state, and stops operation when the power supply switch is in the OFF state.

3. The audio data processing device according to claim 2, further comprising
    a power supplying unit that supplies operational power to the signal processor, wherein
    the power supplying unit supplies the operational power to the first signal processing unit and the second signal processing unit when the power supply switch is in the ON state, and continues to supply the operational power to the first signal processing unit and does not supply the operational power to the second signal processing unit when the power supply switch is in the OFF state.

4. The audio data processing device according to claim 3, wherein the input terminal, the output terminal, and the through terminal are equipped as a MADI interface card, and the power supplying unit does not supply the operational power to the first signal processing unit when it is detected that the through terminal does not exist in an equipped MADI interface card and when the power supply switch is in the OFF state.

5. The audio data processing device according to claim 2, wherein the first signal processing unit and the second signal processing unit include a programmable logic device.

6. The audio data processing device according to claim 1, further comprising:

a relay circuit that switches between connection and disconnection of the input terminal and the through terminal and between connection and disconnection of the through terminal and the signal processor, wherein the relay circuit disconnects the input terminal and the through terminal and connects the through terminal and the signal processor both when the power supply switch is in the ON state and when the power supply switch is in the OFF state, and connects the input terminal and the through terminal and disconnects the through terminal and the signal processor when an external power supply is lost.

7. The audio data processing device according to claim 1, wherein the signal processor includes a programmable logic device.

* * * * *